United States Patent [19]

Takenaka

[11] Patent Number: 5,245,167
[45] Date of Patent: Sep. 14, 1993

[54] BAR-CODE READING APPARATUS

[75] Inventor: Shinya Takenaka, Osaka, Japan

[73] Assignee: Sumitomo Electric Industries, Ltd., Osaka, Japan

[21] Appl. No.: 724,923

[22] Filed: Jul. 2, 1991

[30] Foreign Application Priority Data

Jul. 2, 1990 [JP] Japan ................... 2-175566

[51] Int. Cl.$^5$ .............................. G06K 7/10
[52] U.S. Cl. ................... 235/462; 235/463; 235/467; 235/472
[58] Field of Search ............ 235/462, 463, 467, 472

[56] References Cited

U.S. PATENT DOCUMENTS

| | | | |
|---|---|---|---|
| 3,932,840 | 1/1976 | Hanchett | 235/462 X |
| 4,135,663 | 1/1979 | Nojiri | 235/463 |
| 4,323,772 | 6/1982 | Sergie | 235/462 X |
| 4,781,596 | 11/1988 | Weinblatt | 235/472 |
| 5,086,215 | 2/1992 | Carsner | 235/463 |
| 5,124,538 | 6/1992 | Lopinski | 235/467 |

FOREIGN PATENT DOCUMENTS 0036951 10/1981 European Pat. Off. .

Primary Examiner—Harold Pitts
Attorney, Agent, or Firm—Cushman, Darby & Cushman

[57] ABSTRACT

A bar-code reading apparatus in which a bar-code is scanned and processed for recognition of the bar-code on the basis of the scanning comprises scanning signal storage means for storing scanning signals which are obtained by scanning the bar-code and which correspond to bars and/or spaces scanned in at least two successive scannings. A counter counts the number of bars and/or spaces scanned in each scanning, while a number-of-bars storage means stores count values of the counter means in at least two successive scannings. A first comparison means compares the respective count values of the counter means in the last two scannings stored in the number-of-bars storage means with each other and generates an enabling signal when the count value in the last scanning is not larger than that in the preceding scanning. Finally, a recognition means responds to the enabling signal and operates to read the scanning signal preceding the last signal stored in the scanning signal storage means, thereby performing a process for recognizing the bar-code.

2 Claims, 2 Drawing Sheets

BAR-CODE READING APPARATUS

BACKGROUND OF THE INVENTION

The present invention generally relates to a bar-code reading apparatus, and particularly relates to an improvement for efficiently performing bar-code reading.

There are several types of conventionally used bar-code reading apparatuses. Namely, there are (i) the pen type in which an operator holds a pen-like casing provided with a reading head at its front end so as to manually scan a bar-code from its one end to its other end by using the reading head; (ii) the touch type in which the apparatus makes contact with a bar-code and in which a symbol surface on which the bar-code is formed, is illuminated so that reflective light from the symbol surface is directed towards a linear image sensor so as to form a bar-code image on a photo detection surface of the linear image sensor; (iii) the laser type in which a bar-code is scanned at a high speed by a laser spot so that reflective light from the symbol surface is detected to thereby perform the reading;

In view of the mode of use, the above reading apparatuses are classified into that of the holding type in which an operator performs reading while holding the reading apparatus and that of the fixed type in which the reading apparatus is disposed in the fixed state and a symbol surface on which a bar-code is formed is directed to the apparatus.

In all the foregoing bar-code reading apparatuses except the pen-type bar-code reading apparatus in which a bar-code scanning is performed manually, reading is made by plural times of bar-code scanning. That is, a bar-code is scanned by a laser spot by plural times in the laser-type bar-code reading apparatus, and a bar-code image formed on a photo detection surface of an image sensor is electrically scanned by plural times in the touch-type bar-code reading apparatus.

Further, since the scanning by means of a laser spot is continuous, the electric scanning is performed before a bar-code enters the range of the reading field of view of the apparatus and there occurs inevitably a state where a scanning line SL crosses only a part of a bar-code 1 as shown in FIGS. 3A and 3B in the process in which the reading apparatus is brought toward the bar-code or the bar-code is directed to the reading apparatus. In order to correctly read the bar-code 1, it is necessary to establish the positional relation between the reading apparatus and the bar-code 1 so that the scanning line SL crosses the whole of the bar-code 1 from its one end to its other end as shown in FIG. 3C. Therefore, correct reading cannot be expected in the respective states illustrated in FIGS. 3A and 3B, and consequently there is a possibility of occurrence of erroneous reading in the process in which the positional relation between the bar-code and the reading apparatus is being established.

A bar-code expresses one digit (or one English character), for example, by a plurality of bars and spaces which are of different thicknesses from one another. However, generally, the number of digits or characters in whole of the bar-code is not fixed. Therefore, even when the scanning line SL crosses only a part of the bar-code 1 as shown in FIGS. 3A and 3B, if scanning is performed to the boundary of digits, decoding is performed to that position and the result of the partial decoding is erroneously recognized as the result of the whole decoding, so that erroneous data are supplied to a computer or the like.

In order to correctly perform a processing in a computer, for example, a check digit (a kind of parity) is sometimes added to a bar-code in advance so that when the number of digits are not equalized, it is determined that there is a reading error and a signal for instructing another reading is applied to the reading apparatus. In such cases, however, it takes a long time until the instruction to make another reading is applied from the computer to the reading apparatus. Therefore, it is necessary for the operator to perform the procedure for reading the bar-code again. As a result, the efficiency of data input work for bar-code reading is remarkably lowered.

SUMMARY OF THE INVENTION

It is therefore an object of the present invention to solve the foregoing technical problems in the prior art and to provide reading, apparatus, in which a bar-code can be accurately read in one reading procedure to thereby substantially improve the efficiency of data input work for bar-code reading.

In the bar-code reading apparatus for attaining the above objective according to the present invention, a bar-code is scanned and a process for recognizing the bar-code is performed on the basis of the scanning. The bar-code reading apparatus comprises: 1) scanning signal storage means for storing scanning signals which are obtained by scanning the bar-code and which correspond to bars and/or spaces scanned in at least two times of succeeding scannings, 2) counting means for counting number of bars and/or spaces scanned in each time of the scanning, 3) number-of-bars storage means for storing count values of the counter means in at least two times of succeeding scannings, 4) first comparison means for comparing the respective count values of the counter means in the two times of scannings stored in the number-of-bars storage means with each other and for generating an enabling signal when the count value in the succeeding scanning is not larger than that in the preceding scanning, and 5) recognition means responsive to the enabling signal to operate to read one of the two scanning signals corresponding to the two times of scannings stored in the scanning signal storage means, the one scanning signal corresponding to the preceding scanning, thereby performing a processing for recognizing the bar-code.

According to the foregoing configuration, the number of bars and/or spaces scanned, whenever a bar-code is scanned, is detected, and any processing for recognizing the bar-code is not performed so long as the number of detected bars and/or spaces increases in the second of two consecutive scannings. When the number of detected bars and/or spaces not increase, the processing for recognizing the bar-code is performed for the first scanning.

Thus, no recognition processing is performed in a period in which the bar-code and the reading apparatus are in the positional relation where the reading apparatus cannot scan the whole of a bar-code in the process in which an operator brings the reading apparatus toward the bar-code or leads the bar-code into the range of field of view of the reading apparatus, The recognition process is performed for the first time at a point in time when the scanning line crosses all the bars and/or spaces. Consequently, the recognition process is never performed in the state where an erroneous reading is stored in the scanning signal storage means.

The bar-code reading apparatus may comprise, in addition to the foregoing configuration, second comparison means for comparing the count value of the counter means with a predetermined reference value and for producing an enabling signal for allowing the first comparison means and the recognition means to operate when the count value has exceeded the reference value.

In such a configuration, useless operation of the first comparison means and the recognition in the state where the object read is noise which is not apparently different from a bar-code or in instances where a bar-code can not be apparently recognized bar-code recognition is prevented from being performed by utilizing the fact that the minimum number of bars and/or spaces constituting a bar-code is roughly fixed. Therefore, maloperation due to picked up noises can be prevented from occurring, processing efficiency can be further improved, and power consumption can be reduced.

PREFERRED EMBODIMENT OF THE INVENTION

The present invention will be described below with reference to the accompanying drawings.

Figure 1:
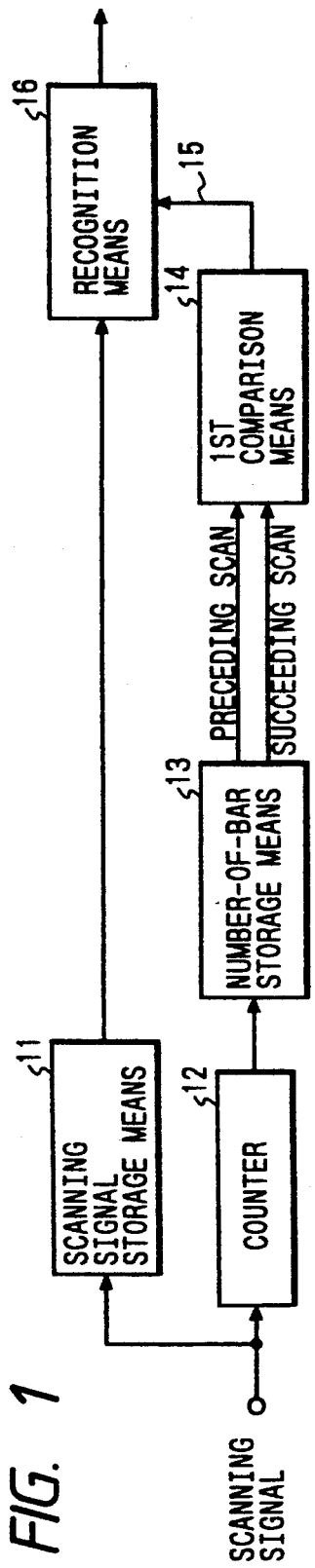
FIG. 1 is a block diagram showing the fundamental configuration of the bar-code reading apparatus according to the present invention.

In the bar-code reading apparatus according to the present invention, as shown in FIG. 1, a scanning signal obtained from a photo detection element in a laser-type bar-code reading apparatus or from an image sensor in a touch-type bar-code reading apparatus, or the like, is applied to a scanning signal storage means 11 for storing the scanning signal A counter means 12 counts the number the bars and/or spaces scanned each time of bar-code is scanned, and the count value is applied to a number-of-bars storage means 13 so as to be stored therein.

The scanning signal storage means 11 stores scanning signals obtained by at least two to successive scannings and, on the other hand, the number-of-bars storage means 13 stores the count values of the counter means 12 in at least two successive scannings.

The count values of the counter means 12 which are stored in the number-of-bars storage means 13 and which correspond to the two preceding scannings are compared with each other in a first comparison means 14. The comparison means 14 outputs an enabling signal onto a line 15 when the count value (for example, the count value of the number of bars) in the second of the two preceding scannings is not larger than the count value in the first, the enabling signal being applied to a recognition means 16.

In response to the enabling signal, the recognition means 16 reads one of the scanning signals stored in the scanning signal storage means 11 corresponding to the two times of scannings. The one read scanning signal corresponds to the preceding scanning, so that the recognition means 16 performs a bar-code recognition processing on the basis of the thus read-out scanning signal.

The details of the present invention will be described below with reference to FIG. 2.

Figure 2:
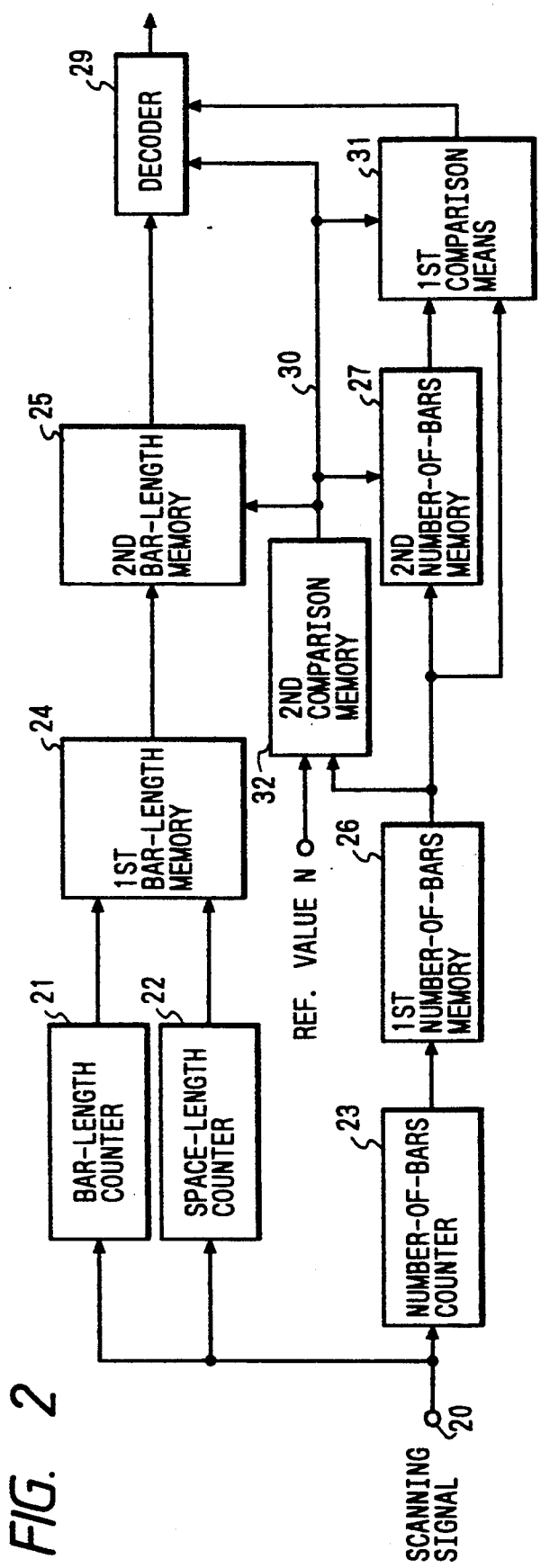
FIG. 2 is a block diagram showing the fundamental configuration of an embodiment of the bar-code reading apparatus according to the present invention.
Figure 3A:
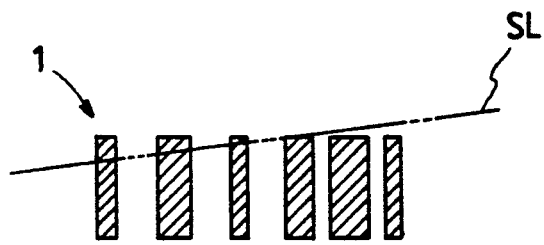
FIG. 3a, 3b and 3c are diagrams useful for explaining the bar-code scanning operation.
Figure 3B:
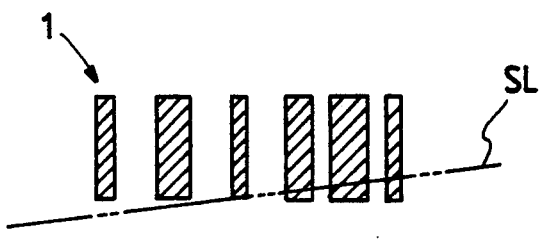
Figure 3C:
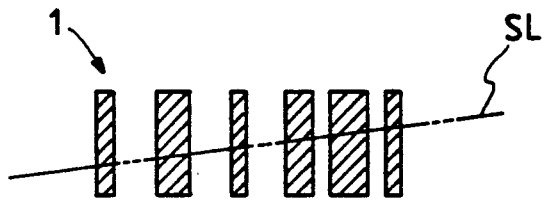

FIG. 2 is a block diagram showing the fundamental configuration of an embodiment of the bar-code reading apparatus according to the present invention. For example, in a laser-type bar-code reading apparatus, a signal produced from a detection element (not shown) for receiving reflection light from a symbol surface is supplied, as a scanning signal, through an input terminal 20 common to a bar-length count 21, a space-length counter 22, and a counter 23 which provides means for counting the number of bars.

Here, the bar-length counter 21 detects the length in the scanning direction of each of the bars constituting the bar-code which to be read. The count value of the bar-length counter 21, corresponding to the length of each of the bars, is stored, for every bar, in a first bar-length memory 24. Similarly, the space-length counter 22 detects the length of each of the spaces, and the count value is stored, for every space, in the first bar-length memory 24.

The first bar-length memory 24 can store the respective count values of the bar-length counter 21 and the space-length counter 22 for at least one bar-code scanning. In the next bar-code scanning, the first bar-length memory 24 supplies the storage contents thereof to a second bar-length memory 25 so that it can store new count values. The storage contents of the second bar-length memory 25 are supplied to and decoded by a decoder 29 which is a recognition means, and the results of decoding are supplied to a personal computer (not shown) or the like. The storage contents of the first and second bar-length memories 24 and 25 are substantially equivalent to scanning signals. In this embodiment, a scanning signal storage means is constituted by the first and second bar-length memories 24 and 25.

The number-of-bars counter 23, on the other hand, counts the number of bars crossed by a spot formed by laser light on a symbol surface every time the laser light scans a bar-code. That is, the number-of-bars counter 23 counts the number of bars crossed by a scanning line which is a locus of the spot on the symbol surface.

The count value of the number-of-bars counter 23 is stored in a first number-of-bars memory 26. The first number-of-bars memory 26 can store the number of bars (the count value of the number-of-bars counter 23) counted in at least one bar-coding scanning. The storage contents of this first number-of-memory 26 are then stored in a second number-of-bars memory 27, for example, at the initiation of the next scanning. As a result, the number of bars crossed by the scanning line in a subsequent scanning is stored in the first number-of-bars memory 26, while the number of bars crossed by the preceding scanning line is stored in the second number-of-bars memory 27. Thus, the number-of-bars storage means for storing the respective numbers of bars scanned in two successive scannings is constituted by the first and second number-of-bars memories 26 and 27. In this embodiment, the above-mentioned two times of scannings are two times of scannings performed continuously and successively.

The storage value of the first number-of-bars memory 26 is supplied to first and second comparators 31 and 32. The second comparator 32 compares the storage value of the first number-of-bars memory 26 with a predetermined reference value (for example, 8). When a value not smaller than the above-mentioned reference value N has been stored in the first number-of-bars memory 26, the second comparator 32 supplies an enabling signal, through a line 30, to the second bar-length memory 25, the second number-of-bars memory 27, the first comparator 31, and the decoder 29, thereby allowing those constituent members to operate. That is, since the number of bars constituting a bar-code is generally not smaller than 20-30, it is concluded that no bar-code exists within a range of field of view when the number of detected bars is too small to reach it is desirable that such erroneous reference value N, and the data be ignored. By use of this minimum reference value, a maloperation due to picked-up noises can be prevented from occurring, processing efficiency can be improved, and power consumption can be reduced.

The first comparator 31 compares the storage values of the first and second number-of-bars memories 26 and 27 with each other, and supplies a decode-enable signal through a line 33 to the decoder 29 when the storage value of the second number-of-bars memory 27 is not larger than that of the first number-of-bars memory 26. That is, the first comparator 31 allows the decoder 29 to decode the bar-code reading results in the preceding scanning (the storage contents of the second bar-length memory 25) when any number of bars detected in the scanning is not larger than that in the preceding scanning.

In the process in which the reading apparatus is directed towards a bar-code or in which the bar-code is directed toward a reading apparatus, it is considered that the number of bars crossed by a scanning line generally increases because the crossing state is shifted from one in which the scanning line is crossing a part of the bar-code to a crossing state in which the scanning line is crossing the whole bar-code. Therefore, if a scanning signal in a particular scanning is decoded when the number of bars in a subsequent is not larger than that in the preceding scanning, recognition processing will have been performed for a scanning signal obtained in the state where the scanning line is crossing the whole of the bar-code.

Thus, in the configuration of this embodiment, since decoding is not performed before a state in which a scanning line crosses the whole bar-code has been reached, a useless and time consuming decoding operation can be prevented from being performed before such a positional relation between the bar-code and the reading apparatus has been established. Consequently, reading of a bar-code is surely performed to thereby prevent erroneous information from being applied to a computer, or the like. Therefore, cases in which an operator must perform plural reading procedures in response to a message from a computer or the like is reduced, so that the of data input work by bar-code reading is substantially improved.

The present invention is not limited to the foregoing embodiment. For example, although the length of bars and spaces in the scanning direction is detected by the bar-length counter 21 and the space-length counter 22 respectively in the above embodiment, the space-length counter 22 may be omitted. Further, although only the number of bars is counted by the number-of-bars counter 23 in the above embodiment, the number of spaces may also be counted. Alternatively, the sum of bars and spaces may be counted, or only the number of spaces may be counted. Moreover, although the second comparator 32 is provided so as to make the second bar-length memory 25 and the like be disabled when the number of bars does not reach the reference value N so that a maloperation due to noises can be reduced and the processing can be performed efficiently in the foregoing embodiment, the second comparator 32 is not always required to be provided.

Furthermore, various design changes can be made within a range where the scope of the present invention is not changed.

As described above, in the bar-code reading apparatus according to the present invention, recognition processing is not performed in a period in which a bar-code and the reading apparatus are in a positional relation so that the whole bar-code cannot be scanned. In other words, the process in which an operator directs the reading apparatus toward to the bar-code or leads the bar-code into the range of field of view of the reading apparatus, the recognition processing will not be performed until the scanning line crosses all bars and/or spaces. As a result, reading of a bar-code is surely attained by one reading operation, and therefore the necessity of a subsequent reading operation is reduced, so that the efficiently data input by bar-code reading is significantly improved.

What is claim is:

1. A bar-code reading device by which a bar-code having bars and spaces is scanned and processed for recognition of said bar-code on the basis of the scanning, said reading device comprising:

scanning signal storage means for storing scanning signals which are obtained by scanning said bar-code and which correspond to at least one of said bars and spaces scanned in at least two successive scannings;

counter means for counting the number of at least one of said bars and spaces scanned in each scanning;

number-of-bars storage means for storing count values of said counter means in said at least two successive scannings;

first comparison means for comparing the respective count values of said counter means for successive scannings stored in said number-of-bars storage means with each other and for generating an enabling signal when the count value of any scanning is not larger than that of the preceding scanning; and recognition means responsive to said enabling signal, said recognition means operating to read the scanning signal stored in said scanning signal storage means corresponding to said preceding scanning, thereby performing a process processing for recognizing said bar-code.

2. A bar-code reading apparatus according to claim 1, further comprising a second comparison means for comparing the count value of said counter means with a predetermined reference value and for producing an enabling signal for allowing said first comparison means and said recognition means to operate when said count value exceeds said reference value.

* * * * *